(12) United States Patent
Prosyk et al.

(10) Patent No.: US 6,650,458 B1
(45) Date of Patent: Nov. 18, 2003

(54) ELECTRO-OPTIC MODULATOR WITH CONTINUOUSLY ADJUSTABLE CHIRP

(75) Inventors: Kelvin Prosyk, Ottawa (CA); Ian Betty, Ottawa (CA)

(73) Assignee: Bookham Technology PLC, Abingdon (GB)

(*) Notice: Subject to any disclaimer, the term of this patent is extended or adjusted under 35 U.S.C. 154(b) by 0 days.

(21) Appl. No.: 10/254,594

(22) Filed: Sep. 26, 2002

(51) Int. Cl.$^7$ .............................. G02F 1/01; G02F 1/035
(52) U.S. Cl. ..................... 359/276; 359/237; 385/2; 385/3; 385/9
(58) Field of Search ........................... 359/276, 237, 359/239; 385/1–3, 8, 9, 40, 41, 14

(56) References Cited

U.S. PATENT DOCUMENTS 6,552,838 B2 * 4/2003 Ransijn et al. .............. 359/237

2002/0159668 A1 * 10/2002 Williams et al. ................ 385/3

* cited by examiner

*Primary Examiner*—Georgia Epps
*Assistant Examiner*—M. Hasan
(74) *Attorney, Agent, or Firm*—Lahive & Cockfield, LLP

(57) ABSTRACT

An electro-optic modulator having a continuously adjustable chirp is provided. Optical signals input into the electro-optic modulator are divided into portions which are phase modulated in opposite senses, one portion imparted with a positive chirp and the other with a negative chirp. Variable couplers are used to adjust (by way of adjusting their coupling ratios) the amount of power allocated between the optical signals contributing to the positive chirp and the power of signals contributing to the negative chirp so that when the optical signals are combined an optical signal with an adjustable chirp is produced.

15 Claims, 4 Drawing Sheets

ELECTRO-OPTIC MODULATOR WITH CONTINUOUSLY ADJUSTABLE CHIRP

FIELD OF THE INVENTION

The invention relates to optical signal modulation and more particularly to electro-optic modulators incorporating phase modulation.

BACKGROUND OF THE INVENTION

Networks with topologies more complicated than simple point-to-point or ring architectures have variable amounts of fibre dispersion at each wavelength, depending on where the wavelength is being routed, and the distance, fibre type, and dispersion map present in each section of the link.

To make such networks capable of flexible and intelligent provisioning, especially with the use of a software operating system instead of hardware re-configurations, a method of compensating changes in dispersion caused by alterations in the route of a particular wavelength is required. In particular, it would be desirable for transmission systems set up to compensate particular dispersion conditions in the network to be flexible enough to adapt to changing conditions in the network.

Chromatic dispersion which occurs naturally in the single mode fibers of standard optical networks causes a frequency shift in the leading edge of an optical pulse and a different frequency shift in the trailing edge of an optical pulse due to different speeds of transmission of light with different frequencies. This kind of dispersion may be compensated for by adding a chirp to the optical signals at the transmission end.

A common technique used to modulate optical data signals is to split the optical signal, impart a phase modulation to one of the split portions of the optical signal, and recombine the phase modulated and unmodulated portions of the optical signal. With proper choice of phase modulation, constructive and destructive interference between the two portions will result in an amplitude modulated combined signal. One side effect of this method of amplitude modulation is signal chirp. The phase modulation may be described as a phase shift as a function of time $\theta(t)$. A logical "0" and a logical "1" may be represented by different phase shifts. It should be noted that all phases described herein are defined with reference to the wavelength of the optical carrier signal to be modulated and are in units of radians. It also should be noted that whenever the frequency of an optical signal is referred to it should be understood as being a reference to the instantaneous frequency of the optical signal. One possible choice of phase shifts is a phase shift of 0 representing a logical "0" and a phase shift of $\pi$ representing a logical "1". As $\theta(t)$ varies in time during the modulation from a logical "0" state to the logical "1" state, the phase shift $\theta(t)$ varies from 0 to $\pi$, and during the modulation from a logical "1" state to the logical "0" state, the phase shift $\theta(t)$ varies from $\pi$ to 0. In the modulation of a logical "1" from a data pulse, since the phase of the resulting modulated optical signal has been increased during the rise of the data pulse (the leading edge), the frequency of the signal is slightly increased during the time of this rising edge. The increase in frequency is exhibited as a blue shift of the leading edge of an optical pulse in the combined optical signal. Since the phase of the resulting modulated optical signal has been decreased during the fall of the data pulse (the trailing edge), the frequency of the signal is slightly decreased during the time of this falling edge. The decrease in frequency is exhibited as a red shift of the trailing edge of an optical pulse in the combined optical signal. The blue shifting of the leading edge and the red shifting of the trailing edge is known as positive chirp. It should be noted that the particular values of 0 and $\pi$ are not required for positive chirp, but in general it is the sign of the rate of change of the phase shift which determines the chirp. If $\phi(t)$ is increasing ($d\phi(t)/dt$ is positive) on a leading edge of an optical pulse, and if $\phi(t)$ is decreasing ($d\phi(t)/dt$ is negative) on the trailing edge, the optical signal is positively chirped.

Another possible choice of phase shifts is a phase shift of $\pi$ representing a logical "0" and a phase shift 0 representing a logical "1". As $\theta(t)$ varies in time during the modulation from a logical "0" state to the logical "1" state, the phase shift $\theta(t)$ varies from $\pi$ to 0, and during the modulation from a logical "1" state to the logical "0" state, the phase shift $\theta(t)$ varies from 0 to $\pi$. In the modulation of a logical "1" from a data pulse, since the phase of the resulting modulated optical signal has been decreased during the rise of the data pulse (the leading edge), the frequency of the signal is slightly decreased resulting in a red shift of the leading edge. Since the phase of the resulting modulated optical signal has been increased during the fall of the data pulse (the trailing edge), the frequency of the signal is slightly increased resulting in a blue shift of the trailing edge. The red shifting of the leading edge and the blue shifting of the trailing edge is known as negative chirp. As described above, in general it is the sign of the rate of change of the phase shift which determines the chirp. If $\phi(t)$ is decreasing ($d\phi(t)/dt$ is negative) on a leading edge of an optical pulse, and if $\phi(t)$ is increasing ($d\phi(t)/dt$ is positive) on the trailing edge, the optical signal is negatively chirped.

A third possible method of phase modulation creates a zero chirp amplitude modulated signal. In this case two modulated signals are used to create the amplitude modulated signal instead of combining a modulated and unmodulated signal. In this scheme one modulator varies from 0 to $\pi/2$, and the other from 0 to $-\pi/2$ when the data varies from a logical "1" to a logical "0". The signals will be in phase during a logical "1", and out of phase during a logical "0". Since the respective phase changes in opposite directions the combined signal will have no chirp.

Since chromatic dispersion acts similar to signal chirp, insofar as the leading edge of a pulse is shifted in frequency and the trailing edge of a pulse is also shifted in frequency, compensation of chromatic dispersion may be made at the transmission end by transmitting signals with signal chirp opposite to the equivalent chirp caused by the chromatic dispersion. Due to the range of type and magnitude of dispersion and hence the type and amount of chirp that the optical signals will encounter for various conditions along various fibers, the more flexible the chirp characteristics of the transmitter, the more flexible the transmitter will be in terms of its ability to be used.

In each of the schemes described above however, the method of modulation is fixed as is the amount of chirp imparted to the optical signals making it difficult for the transmitter to adapt to different network conditions.

Alternative solutions have been tried in the past, and include having a dispersion compensation device on each channel. This approach, however, is bulky and expensive.

Another approach is to use a standard zero chirp MZ (Mach-Zehnder) amplitude modulator followed by a series phase modulator. This however requires an extra drive signal, adding to cost, size and complexity. In addition, the phase modulator would also require a variable gain broadband driver to adjust the chirp. Maintaining the RF phase timing of the variable gain broadband driver over the full dynamic range of its variable gain is difficult.

Another approach is a single-end-drive amplitude chirped modulator for example an MZ or EA (Electroabsorption) modulator followed by a series phase modulator. With this approach the resultant chirp profile may be non-ideal for highly dispersive links. The phase modulator would require a broadband variable gain amplifier to adjust the chirp, which as mentioned above is a custom part that has a number of drawbacks.

Another approach is a standard push-pull MZ modulator driven by a custom driver containing an XOR gate to invert or pass the signal, a differential pre-amplifier, and two matched variable gain amplifiers, one for each output of the pre-amp. The variable gain amplifier may have issues with signal distortion for large variations in gain on the two matched amplifiers.

It would be desirable for there to be an electro-optic modulator with continuously adjustable chirp to address the need of flexible transmission side chirp control which does not exhibit the various drawbacks mentioned above.

Metro architectures are likely to evolve to more complex topologies as networks expand. Network flexibility and intelligence will be necessary to control costs and reduce complexity. Therefore, there is likely to be a demand for a transmitter with software-controllable chirp that can be dialed to any setting.

SUMMARY OF THE INVENTION

The present invention provides an electro-optic modulator having a continuously adjustable chirp. Optical signals input into the electro-optic modulator are divided into portions which are phase modulated in opposite senses, namely, one portion is imparted with a positive chirp and the other with a negative chirp. Variable couplers adjust the amount of power allocated between the optical signals contributing to the positive chirp and the power of signals contributing to the negative chirp so that when the optical signals are combined an optical signal with an adjustable chirp, adjustable by way of adjusting the coupling ratio, is produced.

The present invention also provides a method for imparting the adjustable chirp or generating an optical signal with the adjustable chirp.

According to a first broad aspect, the invention provides for an electro-optic modulator for generating an output optical signal having an adjustable chirp from at least one input optical signal, the electro-optic modulator comprising, optical signal splitting means for splitting according to an adjustable coupling ratio the at least one input optical signal into a first optical signal and a second optical signal, a first modulating means for amplitude modulating the first optical signal with a positive chirp, generating a positively chirped optical signal, a second modulating means for amplitude modulating the second optical signal with a negative chirp, generating a negatively chirped optical signal, and optical signal combining means for combining according to the adjustable coupling ratio the positively chirped optical signal and the negatively chirped optical signal, generating an output optical signal, by which the adjustable coupling ratio determines a magnitude and a sign of the adjustable chirp of the output optical signal.

In some embodiments of the invention, the first and second modulating means each comprise an interferometer and an optical phase modulator.

In some embodiments of the invention, the positive chirp is equal in magnitude and opposite in sign to the negative chirp.

In some embodiments of the invention, the optical signal splitting means comprises at least one splitting variable coupler having a coupling ratio equal to the adjustable coupling ratio, and the optical signal combining means comprises at least one combining variable coupler having a coupling ratio equal to the adjustable coupling ratio.

Some embodiments of the invention provide for at least one phase shifting means for ensuring that the negatively chirped optical signal and the positively chirped optical signal constructively interfere when the first and second modulating means constructively modulate optical signals passing therethrough.

In some embodiments of the invention, the optical signal splitting means comprises a splitting variable coupler having a coupling ratio equal to the adjustable coupling ratio, the optical signal combining means comprises a combining variable coupler having a coupling ratio equal to the adjustable coupling ratio, the first modulating means comprises a first Mach-Zehnder Interferometer having a first optical phase modulator along a first interferometer waveguide arm, the second modulating means comprises a second Mach-Zehnder Interferometer having a second optical phase modulator along a second interferometer waveguide arm, in which a first optical phase modulator phase modulates a portion of the first optical signal traversing the first interferometer waveguide arm as a function of a first phase function of time, the first phase function of time having a first time derivative, and in which the second optical phase modulator modulates a portion of the second optical signal traversing the second interferometer waveguide arm as a function of a second phase function of time, the second phase function of time having a first time derivative which is the negative of the first time derivative of the first phase function of time.

In some embodiments of the invention, the splitting variable coupler and the combining variable coupler are Mach-Zehnder interferometers with variable DC phase shifters along each of the interferometer waveguide arms.

According to a second broad aspect, the invention provides for an electro-optic modulator for generating an output optical signal having an adjustable chirp from at least one input optical signal, the electro-optic modulator comprising, optical signal splitting means for splitting the at least one input optical signal into a first optical signal, a second optical signal, and N optical signals, the optical signal splitting means having at least one splitting variable coupler having an adjustable coupling ratio for adjusting a power ratio of the first optical signal to the second optical signal, a first optical phase modulator for phase modulating the first optical signal as a function of a first phase function of time, the first phase function of time having a first time derivative, a second optical phase modulator for phase modulating the second optical signal as a function of a second phase function of time, the second phase function of time having a first time derivative which is the negative of the first time derivative of the first phase function of time, and optical signal combining means for combining the first optical signal, a first portion of the N optical signals, the second optical signal, and a second portion of the N optical signals, generating an output optical signal, the optical signal combining means having at least one combining variable coupler having a coupling ratio equal to the adjustable coupling ratio for combining the first and second optical signals according to the adjustable coupling ratio, in which the power and phase of the first portion of the N optical signals are such that when combined with the first optical signal an amplitude modulated optical signal with a positive chirp results, and in which the power and phase of the second portion of the N optical signals are such that when combined with the second optical signal an amplitude modulated optical signal with a negative chirp results, by which the adjustable coupling ratio determines a magnitude and a sign of the adjustable chirp of the output optical signal.

Some embodiments of the invention provide for at least one phase shifting means for ensuring that the amplitude modulated signal with a negative chirp and the amplitude modulated signal with a positive chirp constructively interfere when the first and second modulating means constructively modulate optical signals passing therethrough.

In some embodiments of the invention, the optical signal splitting means comprises a first and a second splitting variable coupler having coupling ratios equal to the adjustable coupling ratio, the optical signal combining means comprises a first and a second combining variable coupler having coupling ratios equal to the adjustable coupling ratio, in which the first splitting variable coupler and the first combining variable coupler are arranged in a configuration of a first Mach-Zehnder interferometer with the first phase modulator situated along a first arm of the first Mach-Zehnder interferometer, in which the second splitting variable coupler and the second combining variable coupler are arranged in a configuration of a second Mach-Zehnder interferometer with the second phase modulator situated along a second arm of the second Mach-Zehnder interferometer, and in which the optical signal combining means comprises an optical combiner for combining an output of the first combining variable coupler and an output of the second combining variable coupler.

In some embodiments of the invention, the first and second splitting variable couplers and the first and second combining variable couplers are Mach-Zehnder interferometers with variable DC phase shifters along each of interferometer waveguide arm.

According to a third broad aspect, the invention provides for an electro-optic modulator for applying an adjustable chirp to at least one input optical signal, the electro-optic modulator comprising, optical signal splitting means for splitting according to an adjustable coupling ratio the at least one input optical signal into a first optical signal and a second optical signal, a first optical phase modulator for phase modulating as a function of a first phase function of time the first optical signal, the first phase function of time having a first time derivative, a second optical phase modulator for phase modulating as a function of a second phase function of time the second optical signal, the second phase function of time having a first time derivative which is the negative of the first time derivative of the first phase function of time, and optical signal combining means for combining according to the adjustable coupling ratio the first optical signal and the second optical signal after they have been modulated, generating an output optical signal, by which the adjustable coupling ratio determines a magnitude and a sign of the adjustable chirp applied to the at least one input optical signal to generate the output optical signal.

According to a fourth broad aspect, the invention provides for a method of generating an output optical signal having an adjustable chirp from at least one input optical signal, the method comprising, splitting according to an adjustable coupling ratio the at least one input optical signal into a first optical signal and a second optical signal, amplitude modulating the first optical signal with a positive chirp, generating a positively chirped optical signal, amplitude modulating the second optical signal with a negative chirp, generating a negatively chirped optical signal, and combining according to the adjustable coupling ratio the positively chirped optical signal and the negatively chirped optical signal, generating an output optical signal, by which the adjustable coupling ratio determines a magnitude and a sign of the adjustable chirp of the output optical signal.

According to a fifth broad aspect, the invention provides for a method of generating an output optical signal having an adjustable chirp from at least one input optical signal, the method comprising, splitting the at least one input optical signal into a first optical signal, a second optical signal, and N optical signals, adjusting a power ratio of the first optical signal to the second optical signal according to an adjustable coupling ratio, phase modulating the first optical signal as a function of a first phase function of time, the first phase function of time having a first time derivative, phase modulating the second optical signal as a function of a second phase function of time, the second phase function of time having a first time derivative which is the negative of the first time derivative of the first phase function of time, and combining the first optical signal, a first portion of the N optical signals, the second optical signal, and a second portion of the N optical signals, in which the first and second optical signals are combined according to the adjustable coupling ratio, generating an output optical signal, in which the power and phase of the first portion of the N optical signals are such that when combined with the first optical signal an amplitude modulated optical signal with a positive chirp results, and in which the power and phase of the second portion of the N optical signals are such that when combined with the second optical signal an amplitude modulated optical signal with a negative chirp results, and in which the amplitude modulated signal with a negative chirp and the amplitude modulated signal with a positive chirp constructively interfere when they are combined, by which the adjustable coupling ratio determines a magnitude and a sign of the adjustable chirp of the output optical signal.

According to a sixth broad aspect the invention provides for a method of applying an adjustable chirp to at least one input optical signal, the method comprising, splitting according to an adjustable coupling ratio the at least one input optical signal into a first optical signal and a second optical signal, phase modulating as a function of a first phase function of time a first optical signal, the first phase function of time having a first time derivative, phase modulating as a function of a second phase function of time a second optical signal, the second phase function of time having a first time derivative which is the negative of the first time derivative of the first phase function of time, and combining according to the adjustable coupling ratio the first optical signal and the second optical signal after they have been modulated, generating an output optical signal, by which the adjustable coupling ratio determines a magnitude and a sign of the adjustable chirp applied to the at least one input optical signal to generate the output optical signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Although the specific embodiments described herein are examples of electro-optic modulators which perform amplitude modulation through the use phase modulation, it is to be understood that the invention contemplates phase modulation of an optical signal without the accompanying amplitude modulation. Although such an application is rare, it is within the scope of principles of the invention described herein.

Figure 1:
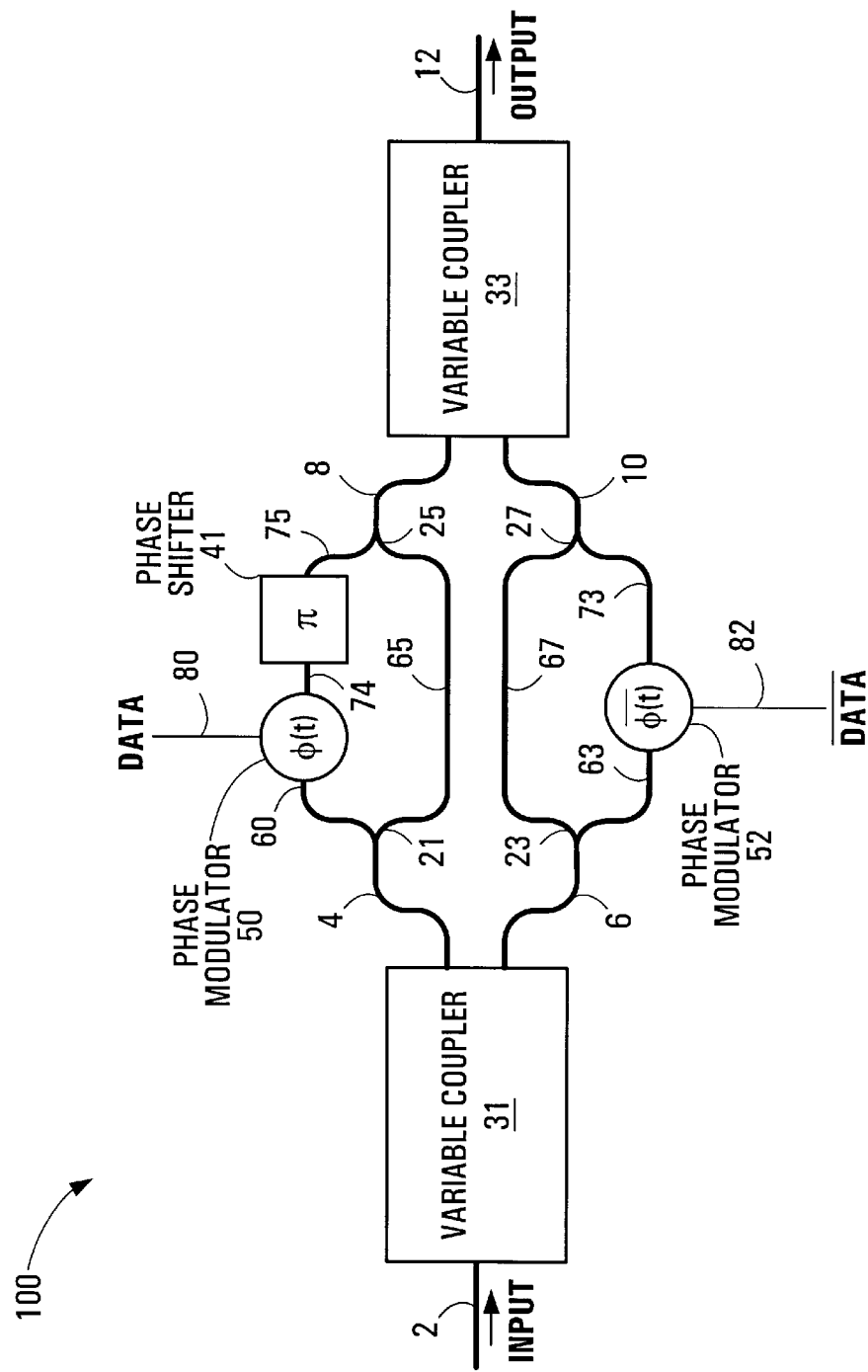
FIG. 1 is a block diagram of an electro-optic modulator having a continuously adjustable chirp constructed according to a preferred embodiment the invention.

Referring to FIG. 1, an electro-optic modulator 100 with continuously adjustable chirp, constructed according to a preferred embodiment of the invention is described. This multistage modulator 100 is based on a Mach-Zehnder Modulator (MZM) type architecture.

Basically, in this preferred embodiment, the electro-optic modulator splits the power of the input signal according to a variable coupling ratio along two branches, one branch imparting a positive chirp to signals passing therethrough, the other imparting a negative chirp to signals passing therethrough. These oppositely chirped signals are then recombined according to the variable coupling ratio, the recombined optical signal having a chirp which depends upon this ratio. In this manner, which essentially determines what proportion of an optical signal is positively or negatively chirped before being recombined, an optical signal may be modulated with variable chirp.

With reference to FIG. 1, the electro-optic modulator, generally indicated by 100, will now be described in terms of its structure. An input waveguide 2 is coupled to an input of an input variable coupler 31 which acts as a variable optical splitter. In the preferred embodiment, the input variable coupler 31 is a variable 2×2 MZI (Mach-Zehnder Interferometer) coupler, a first input of which is unused, and a second input of which is coupled to the input waveguide 2. A first and a second output of the input variable coupler 31 are coupled respectively to an upper branch input waveguide portion 4, and a lower branch input waveguide portion 6. The upper branch input waveguide portion 4 is coupled to an input of a first fixed coupler 21. In the preferred embodiment, the first fixed coupler 21 is a 3 dB MMI (Multimode Interference) 2×2 coupler, a first input of which is unused, and a second input of which is coupled to the upper branch input waveguide portion 4. The lower branch input waveguide portion 6 is coupled to an input of a second fixed coupler 23. In the preferred embodiment, the second fixed coupler 23 is a 3 dB MMI 2×2 coupler, a first input of which is coupled to the lower branch input waveguide portion 6, and a second input of which is unused. First and second outputs of the first fixed coupler 21 are coupled respectively to an upper modulator arm input waveguide portion 60 and an upper bypass arm waveguide portion 65. First and second outputs of the second fixed coupler 23 are coupled respectively to a lower bypass arm waveguide portion 67 and a lower modulator arm input waveguide portion 63.

The upper modulator arm input waveguide portion 60 is coupled to an input of a first phase modulator 50. The first phase modulator 50 has an electric input which is coupled to a first electrical signal connection 80. An output of the first phase modulator 50 is coupled to an upper modulator arm waveguide portion 74. The upper modulator arm waveguide portion 74 is coupled to an input of a fixed phase shifter 41. In the preferred embodiment the fixed phase shifter is set to impart a phase shift of π. The fixed phase shifter 41 may be variable or static, but in general it is "fixed" in the sense that it does not change the shift of the phases of signals passing therethrough at any rate approaching the data bit rate. It is possible that the phase shift may change slightly and periodically for example to compensate for phase shifts caused by environmental or other factors. The fixed phase shifter 41 and each of the remaining phase shifters described herein, could be implemented with an extra length of waveguide, a change in the index of refraction in the waveguide or any other method of imparting a phase shift to optical signals passing therethrough. An output of the fixed phase shifter 41 is coupled to an upper modulator arm output waveguide portion 75.

The lower modulator arm input waveguide portion 63 is coupled to an input of a second phase modulator 52. The second phase modulator 52 has an electric input which is coupled to a second electrical signal connection 82. An output of the second phase modulator 52 is coupled to a lower modulator arm output waveguide portion 73.

The upper modulator arm output waveguide portion 75, and the upper bypass arm waveguide portion 65 are respectively coupled to first and second inputs of a third fixed coupler 25. An output of the third fixed coupler 25 is coupled to an upper branch output waveguide portion 8 which in turn is coupled to a first input of an output variable coupler 33. In the preferred embodiment, the third fixed coupler 25 is a 3 dB MMI 2×2 coupler, a first output of which is unused, and a second output of which is coupled to the upper branch output waveguide portion 8.

The lower bypass arm waveguide portion 67, and the lower modulator arm output waveguide portion 73, are respectively coupled to first and second inputs of a fourth fixed coupler 27. An output of the fourth fixed coupler 27 is coupled to a lower branch output waveguide portion 10 which in turn is coupled to a second input of the output variable coupler 33. In the preferred embodiment, the fourth fixed coupler 27 is a 3 dB MMI 2×2 coupler, a first input of which is coupled to the lower branch output waveguide portion 10, and a second output of which is unused.

In the preferred embodiment, the output variable coupler 33 is a variable 2×2 MZI coupler, a first output of which is unused, a second output of which is coupled to an output waveguide portion 12.

The output variable coupler 33 has a power combining ratio equal to the power splitting ratio of the input variable coupler 31. An output of the output variable coupler 33 is coupled to an output waveguide portion 12.

The input variable coupler 31, instead of being a variable 2×2 coupler with one of its inputs unused could be a variable 1×2 coupler. The output variable coupler 33, instead of being a variable 2×2 coupler with one of its outputs unused could be a variable 2×1 coupler.

The first, second, third, and fourth fixed couplers 21, 23, 25, and 27 may be fixed 1×2 or 2×1 couplers, or fixed 2×2 couplers with either one of its inputs or outputs unused. Although preferably fixed couplers 21, 23, 25, and 27 are 3 dB MMI 2×2 couplers, they could also be 2×2 directional couplers or could be any other type of 2×2 coupler. Although these couplers could have various relative phase shifts between inputs to be combined and/or outputs which have been split, proper arrangement and use of these couplers and any phase compensating elements would be apparent to those skilled in the art. For the 2×2 MMI couplers of the preferred embodiment, optical signals input to the first and second inputs which are output along the second and respectively first outputs undergo a relative phase shift of π/2 with respect to optical signals which traverse across from the first and second inputs to the respective first and second outputs. As noted above couplers having different phase relationships are easily implemented with small changes to compensate for phase.

With reference to FIG. 1, the function of the electro-optic modulator 100 according to the preferred embodiment will now be discussed. An input optical signal (indicated generally by the label "input") propagates along input waveguide portion 2 toward the input variable coupler 31. Although this optical signal may be any type of optical signal requiring amplitude modulation with a desired amount of chirp, in the preferred embodiment depicted in FIG. 1, it is a continuous wave optical signal which is to be modulated into an optical data stream. The input optical signal enters the input of the input variable coupler 31 and is split according to a first variable coupling ratio into a first optical signal propagating along the upper branch input waveguide portion 4, and a second optical signal propagating along the lower branch input waveguide portion 6, the first variable coupling ratio being the ratio of the power of the first optical signal to the power of the second optical signal. It should be noted that in the preferred embodiment, the variable coupler is an MZI and the relative phase of the first optical signal to the second optical signal emerging therefrom is zero. The variable coupler could also be an MMI or other variable coupler, for which any other relative phase considerations may be accounted for and compensated for by a skilled practitioner in the art. The first optical signal is split by the first fixed coupler 21 into a modulator portion and a bypass portion of the first optical signal. Although various ratios for the first fixed coupler 21 may be chosen, in the preferred embodiment depicted in FIG. 1, the fixed couplers 21, 23, 25, and 27 are each 2×2 MMI 3 dB couplers having a power splitting or combining ratio of 50:50. Due to the nature of the preferred MMI 2×2 fixed couplers, it should be noted that the modulator portion of the first optical signal emerges from the first fixed coupler 21 with a phase of π/2 relative to the phase of the bypass portion of the first optical signal. The second optical signal enters the input of the second fixed coupler 23 and is split into a bypass portion and a modulator portion of the second optical signal. Due to the nature of the preferred MMI 2×2 fixed couplers, it should be noted that the modulator portion of the second optical signal emerges from the second fixed coupler 23 with a phase of π/2 relative to the phase of the bypass portion of the second optical signal. The modulator portion of the first optical signal propagates along the upper modulator arm input waveguide portion 60, while the bypass portion of the first optical signal propagates along the upper bypass arm waveguide portion 65. The bypass portion of the second optical signal propagates along the lower bypass arm waveguide portion 67, while the modulator portion of the second optical signal propagates along the lower modulator arm input waveguide portion 63.

The modulator portion of the first optical signal is input to the first phase modulator 50. In response to electrical data signals (indicated by the label "data") sent to the first phase modulator 50 via the first electrical signal connection 80, the first phase modulator 50 modulates the phase of the modulator portion of the first optical signal passing therethough by shifting its phase. Although the range of phase modulation, that is the range between which particular phase shift will represent a logical "1" and which particular phase shift will represent a logical "0", may generally depend upon the application, and the particular configuration of the electro-optic modulator, in the configuration depicted in the preferred embodiment of FIG. 1, the range of phase modulation between representing a logical "1" and a logical "0" is π in order to achieve a full range of amplitude modulation from complete constructive interference to complete destructive interference. In the preferred embodiment depicted in FIG. 1, the phase modulation representative of a logical "1" is set to 0 while the phase modulation representative of a logical "0" is set to −π. This variation of phase as a function of time which encodes the data signal as a modulation of phase of the modulator portion of the first optical signal is denoted φ(t). As such a modulated portion of the first optical signal which is output from the first phase modulator 50 will have a phase modulation of 0 representing a logical "1" in the signal, and a phase modulation of −π representing a logical "0" in the signal. The modulated portion of the first optical signal is input to the fixed phase shifter 41. The fixed phase shifter 41 imparts a phase shift to the modulator portion of the first optical signal traversing therethrough by π to produce a phase shifted portion of the first optical signal. This phase shift of if is depicted in FIG. 1.

The modulator portion of the second optical signal is input to the second phase modulator 52. In response to electrical signals (indicated by the label "$\overline{\text{data}}$") sent to the second phase modulator 52 via the second electrical signal connection 82, the second phase modulator 52 modulates the phase of the modulator portion of the second optical signal passing therethough by shifting its phase. In the preferred embodiment depicted in FIG. 1, the electrical signals sent along the second electrical signal connection 82 ($\overline{\text{data}}$) may be the inverse or the negative (depending upon the specifics of the operation of second phase modulator 52, and how it is connected to the second electrical signal connection 82) of the electrical signals sent along the first electrical signal connection 80 (data). In the preferred embodiment of FIG. 1, the range of phase modulation by the second phase modulator 52 between representing a logical "1" and a logical "0" is π in order to achieve a full range of amplitude from complete constructive interference to complete destructive interference. This variation of phase as a function of time of the modulator portion of the second optical signal is denoted $\overline{\phi(t)}$. The resulting phase modulation $\overline{\phi(t)}$ imparted by the second phase modulator 52 to the modulator portion of the second optical signal should be the inverse or reverse of the phase modulation imparted by the first phase modulator 52 to the modulator portion of the first optical signal, namely φ(t). In general, the resulting phase modulation $\overline{\phi(t)}$ imparted by the second phase modulator 52 to the modulator portion of the second optical signal should be such that it results in a chirp in the modulator portion of the second optical signal opposite to that resulting from the phase modulation φ(t) imparted by the first phase modulator 50 to the modulator portion of the first optical signal. Specifically, in any embodiment, the first time derivative of the phase modulation imparted by the second phase modulator 52, should be the negative of the first time derivative of the phase modulation imparted by the first phase modulator 50, that is $d\overline{\phi(t)}/dt = -d\phi(t)/dt$. In the preferred embodiment depicted in FIG. 1, the phase modulation representative of a logical "1" in the "$\overline{\text{data}}$" signal is −π while the phase modulation representative of a logical "0" in the "$\overline{\text{data}}$" signal is 0. As such a modulated portion of the second optical signal which is output from the second phase modulator 52 will have a phase modulation of $-\pi$ representing a logical "1" in the signal, and a phase modulation of 0 representing a logical 0 in the signal.

The phase shifted portion and bypass portion of the first optical signal are input to the first and second inputs of the third fixed coupler 25 wherein the optical signals are combined. Due to the nature of the preferred MMI 2×2 fixed couplers, it should be noted that the phase shifted portion of the first optical signal is imparted a phase shift of $\pi/2$ relative to the bypass portion of the first optical signal upon combining. The modulated portion and bypass portion of the second optical signal are input to the first and second inputs of the fourth fixed coupler 27 wherein the optical signals are combined. Due to the nature of the preferred MMI 2×2 fixed couplers, it should be noted that the modulated portion of the second optical signal is imparted a phase shift of $\pi/2$ relative to the bypass portion of the second optical signal upon combining.

The output of the third fixed coupler 25 along upper branch output waveguide portion 8 is a combination of the phase shifted portion and the bypass portion of the first optical signal. In the preferred embodiment of the invention shown in FIG. 1, the third fixed coupler 25 outputs along the upper branch waveguide portion 64 an optical signal proportional to the sum of the phase shifted portion of the first optical signal (shifted by a further $\pi/2$) and the bypass portion of the first optical signal. This optical output from the third fixed coupler 25 is referred to as the combined first optical signal.

The output of the fourth fixed coupler 27 along lower branch output waveguide portion 10 is a combination of the modulated portion and the bypass portion of the second optical signal. In the preferred embodiment of the invention shown in FIG. 1, the fourth fixed coupler 27 outputs along the lower branch output waveguide portion 10 an optical signal proportional to the sum of the modulated portion of the second optical signal (shifted by a further $\pi/2$) and the bypass portion of the second optical signal. This optical output from the fourth fixed coupler 27 is referred to as the combined second optical signal.

The combined first optical signal propagates along the upper branch output waveguide portion 8 to the first input of the output variable coupler 33. The combined second optical signal propagates along the lower branch output waveguide portion 10 to the second input of the output variable coupler 33. The combined first and second optical signals are combined in the output variable coupler 33, according to a second variable coupling ratio into an output optical signal along output waveguide portion 12, the second variable coupling ratio being the ratio of the combining power of the combined first optical signal to the power of the combined second optical signal. In the preferred embodiment, the second variable coupling ratio is equal to the first variable coupling ratio. As mentioned above in the preferred embodiment, the output variable coupler is a variable MZI and the relative phase of combining the combined first optical signal to the combined second optical signal is zero.

With reference to FIG. 1, how the function of the electro-optic modulator built according to the preferred embodiment achieves the desired result of amplitude modulation of a signal with an adjustable chirp will now be discussed.

It should be noted that reference to any values of the phase shifts are made under the assumption that the optical path length for all optical signals propagating between corresponding elements along parallel paths is the same. Specifically, it is assumed that, optical path lengths along the upper and lower branch input waveguide portions 4, 6 are the same. It is assumed that the optical path lengths along the upper and lower bypass arm waveguide portions 65, 67 are the same and are equal to the sum of the optical path length of the lower modulator arm input waveguide portion 63, and the lower modulator arm output waveguide portion 73, and also equal to the sum of the optical path length of the upper modulator arm input waveguide portion 60, the upper modulator arm waveguide portion 74, and the upper modulator arm output waveguide portion 75. Finally it is assumed that the optical path lengths along the upper and lower branch output waveguide portions 8, 10 are the same. In anticipation of any variation in the optical path lengths, phase shifters could be placed at various points in the electro-optic modulator 100 (not shown) to compensate for environmental and various other unwanted factors which affect the phase of optical signals passing through the electro-optic modulator 100. Also not shown are any additional fixed phase shifters for compensating phases introduced by other elements of the opto-electric modulator 100, for example any unwanted relative phases created by couplers.

It should be noted that in the preferred embodiment depicted in FIG. 1, the phase shift of the phase shifter 41, and the range of phase modulation imparted by the first phase modulator 50 are arranged such that a logical "1" or a logical "0" represented in the "data" causes constructive or respectively destructive interference at the third fixed coupler 25 so that a high amplitude or respectively low amplitude (in an exemplary embodiment, the amplitude for a logical "0" is insignificant) output optical signal is output from the third fixed coupler 25. We will sometimes refer to this interference causing amplitude modulation to encode a logical "1" and a logical "0" as "encoding interference".

In the preferred embodiment, the range of phase modulation imparted by the second phase modulator 52 is arranged such that a logical "1" or a logical "0" represented in the "data" causes constructive or respectively destructive encoding interference at the fourth fixed coupler 27 so that a high amplitude or respectively low amplitude (in an exemplary embodiment, the amplitude for a logical "0" is insignificant) output optical signal is output from the fourth fixed coupler 27.

In the preferred embodiment, constructive encoding interference or destructive encoding interference occurs between the optical signals passing through the second phase modulator 52 and the lower bypass arm waveguide portion 67 when a phase shift corresponding to a logical "1" or respectively a logical "0" is imparted to the modulator portion of the second optical signal by the second phase modulator 52.

As can be seen, in the configuration of the preferred embodiment shown, the encoding interference of the phase shifted portion of the first optical signal causing amplitude modulation always occurs at the third fixed coupler 25, and the encoding interference of the modulated portion of the second optical signal causing amplitude modulation always occurs at the fourth fixed coupler 27. In the case where the variable couplers are set to a variable coupling ratio of 100:0, encoding interference only occurs at the third fixed coupler 25, and in the case where the variable couplers are set to a variable coupling ratio of 0:100, encoding interference only occurs at the fourth fixed coupler 27. At any other variable coupling ratio, encoding interference occurs at both the third and fourth fixed couplers 25. At the variable coupler 33, two oppositely chirped optical signals interfere with each other upon combining. We will sometimes refer to this interference which is caused by combining differently chirped signals as "mixing interference".

It is to be noted that in the preferred embodiment, optical signals traversing the first optical coupler 21, and emerging from the first output, and optical signals traversing the second optical coupler 23, and emerging from the second output undergo a phase shift of π/2 relative to the phase of optical signals emerging from their second and first outputs respectively. Moreover, optical signals input along the first input of the third optical coupler 25, and optical signals input along the second input of the fourth optical coupler 27, emerge with a phase shift of π/2 relative to the phase of emerging optical signals input along their second and first inputs respectively. Therefore in the preferred embodiment, optical signals traversing a modulator arm between either fixed couplers 21 and 25 or fixed couplers 23 and 27 undergo (not counting the phase shift imparted by the first phase modulator 50, the first phase shifter 41, or the second phase modulator 52) a total additional phase shift of π relative to the phase of optical signals traversing the respective bypass arms. It is noted in passing that in the preferred embodiment, an additional overall phase shift of π imparted by the variable couplers 31, 33 to the optical signals passing therethrough is immaterial to how the device works.

Taking into account the phase shift caused by the fixed couplers, since in φ(t) a logical "1" is represented by a phase shift of 0, and a logical "0" is represented by a phase shift of −π, the aforementioned encoding interference conditions are met. Taking into account the phase shift caused by the fixed couplers, since in $\overline{\phi(t)}$ a logical "1" is represented by a phase shift of −π, and a logical "0" is represented by a phase shift of 0, the aforementioned encoding interference conditions are met.

It should be noted that because all of the fixed couplers are set to a single coupling ratio of 50:50, and since encoding interference causing amplitude modulation occurs at the fixed couplers 25, and 27, the encoding interference conditions will be met no matter what the variable coupling ratio of the variable couplers 31 and 33 is set to.

It should be noted that other conditions may be present depending on the particular splitters and combiners used, and the particular inputs and outputs used thereof, both of which determine the various relative phases of various optical signals. It also should be borne in mind that the conditions would vary given a different chosen set of values of φ(t) and $\overline{\phi(t)}$ to represent a respective logical "0" and a logical "1". Given any configuration in accordance with the principles of the invention, a skilled practitioner in the art would be able to determine within the constraints the proper value of the phase shifts imparted by the phase shifter 41, an any other additional required phase shifters.

The relative phases used to create appropriately constructive and destructive encoding interference have been discussed. For the purposes of further discussion it is assumed that a logical "1" is represented in the "data" stream as some form of pulse having a rising and a falling edge. As discussed above, appropriate phase modulation results in amplitude modulation, and hence, the combined first optical signal and the combined second optical signal are made up of logical "1"s represented by amplitude pulses. In general, RZ (return to zero), NRZ (non-return to zero) or any data format or shaped pulses may be used. Referring to FIG. 1, the chirp created in the combined first optical signal, and in the combined second optical signal are discussed.

With respect to the combined first optical signal, during a modulation from a logical "0" state to a logical "1" state, the phase shift φ(t) varies from −π to 0, and during the modulation from a logical "1" state back to the logical "0" state, the phase shift φ(t) varies from 0 to −π. In the modulation of a logical "1" from a data pulse, since the phase of the resulting phase shifted first optical signal has been increased during the rise of the data pulse (the leading edge), the frequency of the signal is slightly increased during the time of this rising edge and is exhibited as a blue shift of the leading edge of the pulse. Since the phase of the resulting phase shifted first optical signal has been decreased during the fall of the data pulse (the trailing edge), the frequency of the signal is slightly decreased during the time of this falling edge and is exhibited as a red shift of the trailing edge of the pulse. As described hereinbefore, this is a positively chirped signal.

With respect to the combined second optical signal, during a modulation from a logical "0" state to a logical "1" state, the phase shift φ(t) varies from 0 to −π, and during the modulation from a logical "1" state back to the logical "0" state, the phase shift φ(t) varies from −π back to 0. In the modulation of a logical "1" from a data pulse, since the phase of the resulting modulated second optical signal has been decreased during the rise of the data pulse (the leading edge), the frequency of the signal is slightly decreased during the time of this rising edge and is exhibited as a red shift of the leading edge of the optical pulse. Since the phase of the resulting modulated second optical signal has been increased during the fall of the data pulse (the trailing edge), the frequency of the signal is slightly increased during the time of this falling edge and is exhibited as a blue shift of the trailing edge of the optical pulse. As described hereinbefore, this is a negatively chirped signal.

With reference to FIG. 1, three specific modes of operation for the preferred embodiment of the electro-optic modulator 100 will now be discussed. These modes serve to illustrate the various limits of operation for the modulator 100, which is in general continuously adjustable.

The first mode of operation is chirpless operation. In such a mode, the variable coupling ratio is set to 50:50. As such one half of the power of the input optical signal passes through the upper branch input waveguide portion 4, and one half of the power passes through the lower branch input waveguide portion 6. The resulting output optical signal propagating on output waveguide portion 12 will be made up of a negatively chirped optical signal, and a positively chirped optical signal with the same amplitude modulation, and equal powers. Since the amount of chirp of the negatively chirped signal and the positively chirped signal are exactly the same but of opposite signs (recall d $\overline{\phi(t)}$/dt=−dφ(t)/dt) the resulting modulated optical signal will have no chirp.

The second mode of operation is maximum positive chirp operation. In such a mode, the variable coupling ratio is set to 100:0. As such, all of the power of the input optical signal passes through the upper branch input waveguide portion 4, and none of the power passes through the lower branch input waveguide portion 6. The resulting output optical signal propagating on output waveguide portion 12 will be made up of a maximally positively chirped optical signal only.

The third mode of operation is maximum negative chirp operation. In such a mode, the variable coupling ratio is set to 0:100. As such, none of the input optical signal passes through the upper branch input waveguide portion 4, and all of the power of the input optical signal passes through the lower branch input waveguide portion 6. The resulting output optical signal propagating on output waveguide portion 12 will be made up of a maximally negatively chirped optical signal only.

In general, the electro-optic modulator 100 may be operated at any other coupling ratio, the result being a combination of equally modulated but unequally powered positively and negatively chirped optical signals. This combination will have a non-zero chirp whose sign and magnitude will depend upon the coupling ratio. In this manner, the electro-optic modulator provides an adjustable amount of chirp as a result of varying the coupling ratio of the variable couplers.

Figure 2:
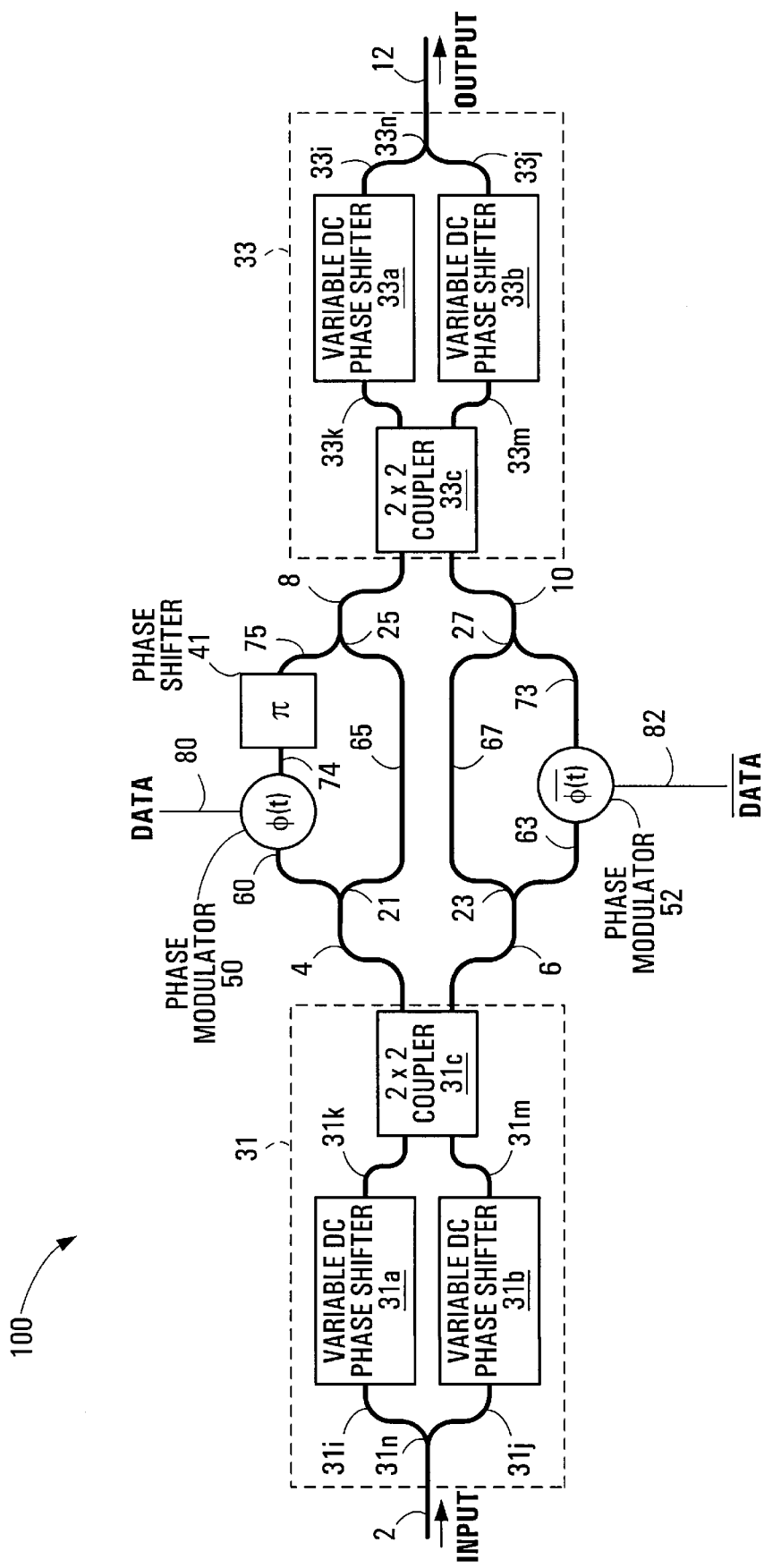
FIG. 2 is a block diagram of a specific implementation of the preferred embodiment.

Referring to FIG. 2, a specific implementation of the preferred embodiment is described. The variable couplers are explicitly shown as variable 2×2 MZIs. Each consists preferably of two 2×2 MMI 3 dB couplers with parallel interconnecting waveguide arms each with a variable DC phase shifter.

The input of the input variable coupler 31 is coupled to a splitter 31n. The splitter 31n may be a 1×2 splitter or a 2×2 splitter with one input unused. In the preferred embodiment it is a 2×2 MMI with an input unused. First and second outputs of the splitter 31n are coupled respectively by waveguide portions 31i and 31j to a first and second variable DC phase shifter 31a, and 31b. Outputs of the variable phase shifters 31a and 31b are coupled to waveguide portions 31k and 31m which are respectively coupled to a first and second input of a 2×2 coupler 31c which is preferably a 3 dB MMI coupler. The first and second outputs of the 2×2 coupler 31c are coupled respectively to the first and second outputs of the input variable coupler 31. The input variable coupler 31 functions to output the signal input to the input variable coupler 31 along its first and second outputs according to a variable combining ratio determined by the relative phase shifts imparted by the first and second variable DC phase shifters 31a, 31b.

The first and second inputs of the output variable coupler 33 are coupled respectively to the first and second inputs of a 2×2 coupler 33c. First and second outputs of the coupler 33c are coupled respectively by waveguide portions 33k and 33m to first and second variable DC phase shifters 33a, and 33b. Outputs of the variable phase shifters 33a and 33b are coupled to waveguide portions 33i and 33j. Waveguide portions 33i and 33j are coupled to a combiner 33n. The combiner 33n may be a 2×1 combiner or a 2×2 combiner with one output unused. In the preferred embodiment it is a 2×2 MMI with an output unused. The second output of the combiner 33n is coupled to the output waveguide portion 12. The output variable coupler 33 functions to combine and output the signals input to the output variable coupler 33 along its first and second inputs according to a variable combining ratio determined by the relative phase shifts imparted by the first and second variable DC phase shifters 33a, 33b.

The rest of the embodiment depicted in FIG. 2 is structured the same as, and functions the same as the embodiment depicted in FIG. 1.

Figure 3:
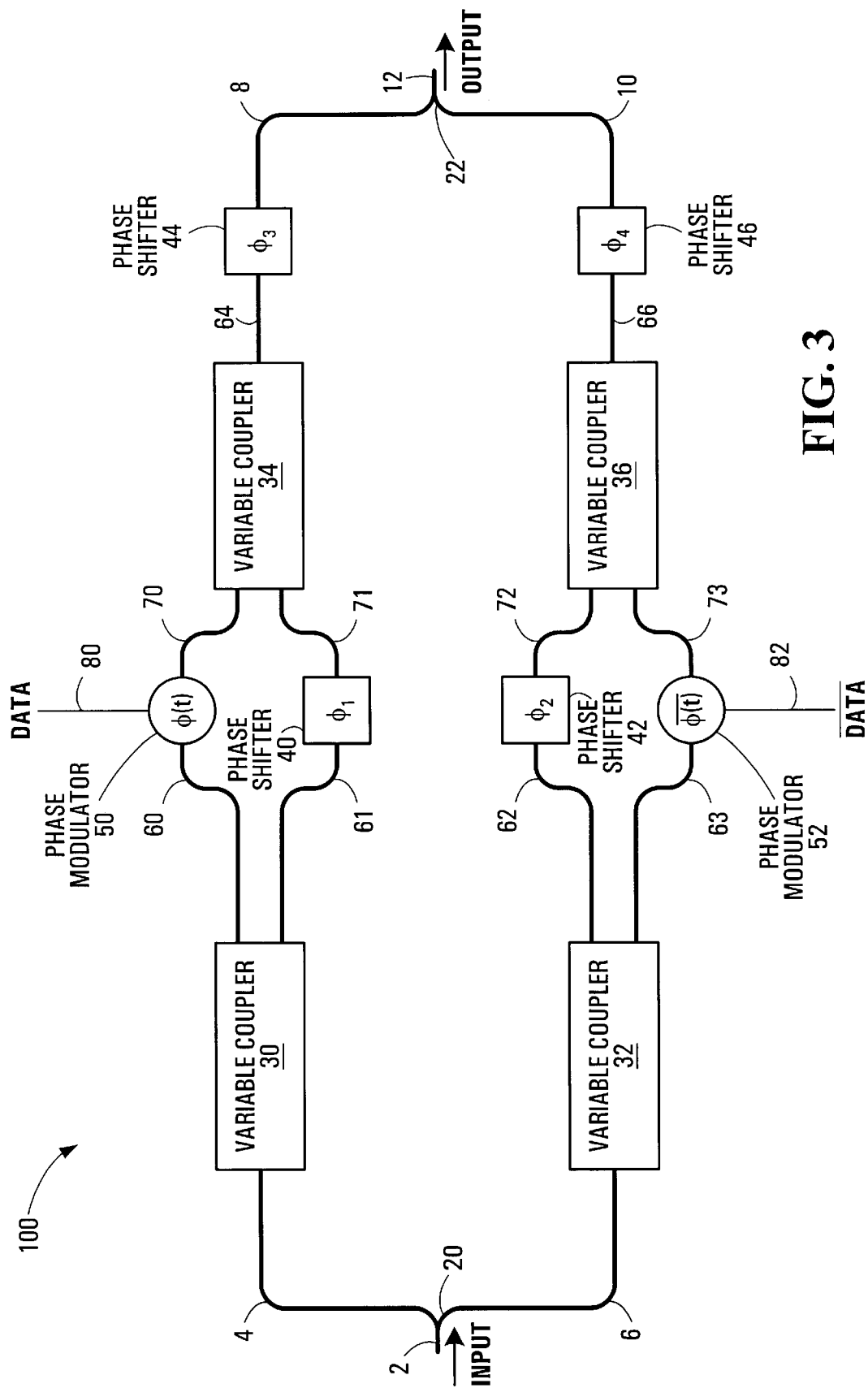
FIG. 3 is a block diagram of an electro-optic modulator having a continuously adjustable chirp constructed according to an alternate embodiment of the invention.

Referring to FIG. 3, an electro-optic modulator 100 with continually adjustable chirp, constructed according to an alternate embodiment of the invention is described. This three stage modulator 100 shown is based on a Mach-Zehnder Modulator (MZM) type architecture.

Basically, in this alternate embodiment, the electro-optic modulator is similar to that of the preferred embodiment except for the substitution of variable couplers for fixed couplers and vice versa. In this embodiment, additional fixed phase shifters have also been added.

In terms of function, basically the electro-optic modulator splits the power of the input signal 50:50 before splitting those signals according to a variable coupling ratio. Inside the electro-optic modulator, signals travelling along one arm are imparted with a positive-chirp-causing phase modulation, and signals travelling along another arm are imparted with a negative-chirp-causing phase modulation. These oppositely modulated signals are then recombined with unmodulated signals creating an output optical signal being the sum of an optical signal having positive chirp and an optical signal having negative chirp. The recombined optical signal has a chirp which depends upon the variable coupling ratio. In this manner an optical signal may be modulated with variable chirp. The constructive and destructive interference occurs at various locations in the electro-optic modulator 100 depending upon the variable coupling ratio. Although different from the operation of the preferred embodiment, the alternate embodiment operates according to the same general principal of combining optical signals of opposite chirp at different power levels to resulting in an adjustably chirped optical signal.

Figure 4:
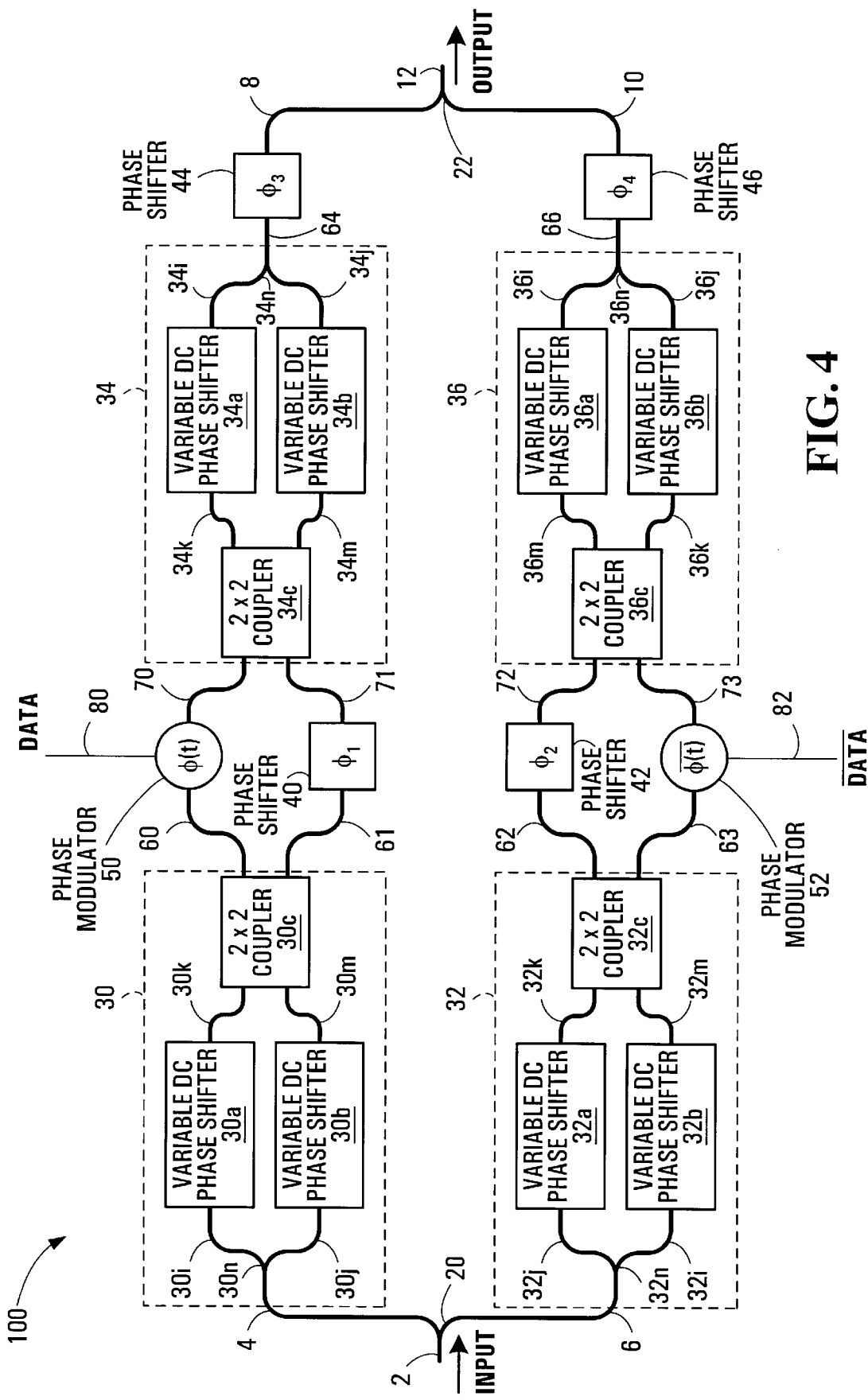
FIG. 4 is a block diagram of a specific implementation of the alternate embodiment.

Similar numbers in the FIGS. 3, and 4 to those of FIGS. 1 and 2 indicate similar elements, although the elements may be arranged differently.

With reference to FIG. 3, the electro-optic modulator 100, constructed according to an alternate embodiment will now be described in terms of its structure. An input waveguide 2 is coupled to an input of an optical splitter 20. In this embodiment, the optical splitter 20 is a 3 dB MMI 2×2 coupler, a first input of which is unused, and a second input of which is coupled to the input waveguide 2. A first and a second output of the optical splitter 20 are coupled respectively to an upper branch input waveguide portion 4, and a lower branch input waveguide portion 6. The upper branch input waveguide portion 4 is coupled to an input of a first variable coupler 30. In this embodiment, the first variable coupler 30 is a variable 2×2 MZI coupler, a first input of which is unused, and a second input of which is coupled to the upper branch input waveguide portion 4. The lower branch input waveguide portion 6 is coupled to an input of a second variable coupler 32. In this embodiment, the second variable coupler 32 is a variable 2×2 MZI coupler, a first input of which is unused, and a second input of which is coupled to the lower branch input waveguide portion 6. First and second outputs of the first variable coupler 30 are coupled respectively to an upper modulator arm input waveguide portion 60 and an upper bypass arm input waveguide portion 61. First and second outputs of the second variable coupler 32 are coupled respectively to a lower bypass arm input waveguide portion 62 and a lower modulator arm input waveguide portion 63.

The upper modulator arm input waveguide portion 60 is coupled to an input of a first phase modulator 50. The first phase modulator 50 has an electric input which is coupled to a first electrical signal connection 80. An output of the first phase modulator 50 is coupled to an upper modulator arm output waveguide portion 70. The upper bypass arm input waveguide portion 61 is coupled to an input of a first phase shifter 40. The first phase shifter 40 and all of the remaining phase shifters discussed below may be variable or fixed, but in general is static in the sense discussed above, namely, that it changes the phases of signals passing therethrough much slower than the data bit rate, but may change periodically for adjusting the modulator to compensate for environmental or other factors. As was the case with the preferred embodiment, the phase shifters may be implemented with an extra length of waveguide, a change in the index of refraction in the waveguide or any other method of imparting a phase shift to optical signals passing therethrough. An output of the first phase shifter 40 is coupled to an upper bypass arm output waveguide portion 71.

The lower modulator arm input waveguide portion 63 is coupled to an input of a second phase modulator 52. The second phase modulator 52 has an electric input which is coupled to a second electrical signal connection 82. An output of the second phase modulator 52 is coupled to a lower modulator arm output waveguide portion 73. The lower bypass arm input waveguide portion 62 is coupled to the input of a second phase shifter 42. An output of the second phase shifter 42 is coupled to a lower bypass arm output waveguide portion 72.

The upper modulator arm output waveguide portion 70, and the upper bypass arm output waveguide portion 71 are respectively coupled to first and second inputs of a third variable coupler 34. In this embodiment, the third variable coupler 34 is a variable 2×2 MZI coupler, a first output of which is unused, and a second output of which is coupled to an upper branch waveguide portion 64 which in turn is coupled to an input of a third phase shifter 44.

The lower bypass arm output waveguide portion 72, and the lower modulator arm output waveguide portion 73, are respectively coupled to first and second inputs of a fourth variable coupler 36. In this embodiment, the fourth variable coupler 36 is a variable 2×2 MZI coupler, a first output of which is unused, and a second output of which is coupled to a lower branch waveguide portion 66 which in turn is coupled to an input of a fourth phase shifter 46.

An output of the third phase shifter 44 is coupled to an upper branch output waveguide portion 8. An output of the fourth phase shifter 46 is coupled to a lower branch output waveguide portion 10. The upper branch output waveguide portion 8 and the lower branch output waveguide portion 10 are coupled respectively to first and second inputs of an optical combiner 22. The optical combiner 22 has a power combining ratio equal to the power splitting ratio of the optical splitter 20, and due to the manner in which it is coupled, imparts a relative phase shift to the optical signals passing therethrough inverse to that imparted to the optical signals split by the optical splitter 20. In this embodiment, the optical combiner 22 is a 3 dB MMI 2×2 coupler, a first output of which is coupled to an output waveguide portion 12, and a second output of which is unused.

The first and second variable couplers 30, 32, of the alternate embodiment, instead of being variable 2×2 couplers with an input unused could be variable 1×2 couplers. The third and fourth variable couplers 34, 36, instead of being variable 2×2 couplers each with one of its outputs unused, could be variable 2×1 couplers.

The optical splitter 20, instead of being a fixed 2×2 coupler with one of its inputs unused, could be a fixed 1×2 coupler. The optical combiner 22, instead of being a fixed 2×2 coupler with one of its outputs unused, could be a fixed 2×1 coupler. Although preferably the optical splitter 20 and the optical combiner 22 are 3 dB MMI 2×2 couplers, they could also be 2×2 directional couplers or could be any other type of 2×2 coupler. Although these couplers could have various relative phase shifts between inputs to be combined and/or outputs which have been split, proper arrangement and use of these couplers and any phase compensating elements would be apparent to those skilled in the art. For the 2×2 MMI couplers of this embodiment, optical signals input to the first and second inputs which are output along the second and respectively first outputs undergo a relative phase shift of $\pi/2$ with respect to optical signals which traverse across from the first and second inputs to the respective first and second outputs. As noted above couplers having different phase relationships are easily implemented with small changes to compensate for phase.

With reference to FIG. 3, the function of the electro-optic modulator 100 constructed according to the alternate embodiment will now be discussed. An input optical signal (indicated generally by the label "input") propagates along input waveguide portion 2 toward the optical splitter 20. Although this optical signal may be any type of optical signal requiring amplitude modulation with a desired amount of chirp, in the embodiment depicted in FIG. 3, it is a continuous wave optical signal which is to be modulated into an optical data stream. The input optical signal is split by the optical splitter 20 into a first optical signal propagating along upper branch wavegude portion 4, and a second optical signal propagating along lower branch waveguide portion 6. Although various ratios for the optical splitter may be chosen, in the embodiment depicted in FIG. 3, the optical splitter 20 is a 2×2 MMI 3 dB coupler having a power ratio of 50:50. Due to the nature of the preferred MMI 2×2 fixed couplers, it should be noted that the first optical signal emerges from the optical splitter 20 with a phase of $\pi/2$ relative to the phase of the second optical signal. The first optical signal enters the input of the first variable coupler 30 and is split according to a first variable coupling ratio into a modulator portion and a bypass portion of the first optical signal, the first variable coupling ratio being the power ratio of the modulator portion to the bypass portion of the first optical signal. The second optical signal enters the input of the second variable coupler 32 and is split according to a second variable coupling ratio into a bypass portion and a modulator portion of the second optical signal, the second variable coupling ratio being the power ratio of the bypass portion to the modulator portion of the second optical signal. In this embodiment the second variable coupling ratio is set equal to the first variable coupling ratio. The modulator portion of the first optical signal propagates along the upper modulator arm input waveguide portion 60, while the bypass portion of the first optical signal propagates along the upper bypass arm input waveguide portion 61. The bypass portion of the second optical signal propagates along the lower bypass arm input waveguide portion 62, while the modulator portion of the second optical signal propagates along the lower modulator arm input waveguide portion 63.

The modulator portion of the first optical signal is input to the first phase modulator 50. In response to electrical data signals (indicated by the label "data") sent to the first phase modulator 50 via the first electrical signal connection 80, the first phase modulator 50 modulates the phase of the modulator portion of the first optical signal passing therethough by shifting its phase. Although the range of phase modulation, that is the range between which particular phase shift will represent a logical "1" and which particular phase shift will represent a logical "0", may generally depend upon the application, in the configuration depicted in the embodiment of FIG. 3, the range of phase modulation between representing a logical "1" and a logical "0" is $\pi$, in order to achieve a full range of amplitude modulation from complete constructive interference to complete destructive interference. In the embodiment depicted in FIG. 3, the phase modulation representative of a logical "1" is set to $\pi$ while the phase modulation representative of a logical "0" is set to 0. This variation of phase as a function of time which encodes the data signal as a modulation of phase of the modulator portion of the first optical signal is denoted $\phi(t)$.

As such a modulated portion of the first optical signal which is output from the first phase modulator 50 will have a phase modulation of π representing a logical "1" in the signal, and a phase modulation of "0" representing a logical 0 in the signal. The bypass portion of the first optical signal is input to the first phase shifter 40. The first phase shifter 40 imparts a phase shift to the bypass portion of the first optical signal traversing therethrough to produce a phase shifted portion of the first optical signal. As shown in FIG. 3, this phase shift is denoted $\phi_1$.

The bypass portion of the second optical signal is input to the second phase shifter 42. The second phase shifter 42 imparts a phase shift to the bypass portion of the second optical signal traversing therethrough to produce a phase shifted portion of the second optical signal. As shown in FIG. 3, this phase shift is denoted $\phi_2$. The modulator portion of the second optical signal is input to the second phase modulator 52. In response to electrical signals (indicated by the label "$\overline{data}$") sent to the second phase modulator 52 via the second electrical signal connection 82, the second phase modulator 52 modulates the phase of the modulator portion of the second optical signal passing therethough by shifting its phase. In the embodiment depicted in FIG. 3, the electrical signals sent along the second electrical signal connection 82 ($\overline{data}$) may be the inverse or the negative of the electrical signals (depending upon the specifics of the operation of second phase modulator 52, and how it is connected to the second electrical signal connection 82) sent along the first electrical signal connection 80 (data) In the configuration depicted in the embodiment of FIG. 3, the range of phase modulation between representing a logical "1" and a logical "0" is π, in order to achieve a full range of amplitude from complete constructive interference to complete destructive interference. This variation of phase as a function of time of the modulator portion of the second optical signal is denoted $\overline{\phi(t)}$. The resulting phase modulation $\overline{\phi(t)}$ imparted by the second phase modulator 52 to the modulator portion of the second optical signal should be the inverse or reverse of the phase modulation imparted by the first phase modulator 52 to the modulator portion of the first optical signal, namely $\phi(t)$. In general, the resulting phase modulation $\overline{\phi(t)}$ imparted by the second phase modulator 52 to the modulator portion of the second optical signal should be such that it results in a chirp in the modulator portion of the second optical signal opposite to that resulting from the phase modulation $\phi(t)$ imparted by the first phase modulator 50. Specifically, in any embodiment, the first time derivative of the phase modulation imparted by the second phase modulator 52, should be the negative of the first time derivative of the phase modulation imparted by the first phase modulator 50, that is $d\overline{\phi(t)}/dt = -d\phi(t)/dt$. In the embodiment depicted in FIG. 3, the phase modulation representative of a logical "1" in the "$\overline{data}$" signal is 0 while the phase modulation representative of a logical "0" in the "$\overline{data}$" signal is π. As such a modulated portion of the second optical signal which is output from the second phase modulator 52 will have a phase modulation of 0 representing a logical "1" in the signal, and a phase modulation of π representing a logical "0" in the signal.

The modulated portion and phase shifted portion of the first optical signal are input to the first and second inputs of the third variable coupler 34 wherein the optical signals are combined according to a third variable coupling ratio. The third variable coupling ratio is the power ratio of combining the modulated portion to the phase shifted portion of the first optical signal, and in this embodiment is equal to the first variable coupling ratio.

The phase shifted and modulated portions of the second optical signal are input to the first and second inputs of the fourth variable coupler 36 wherein the optical signals are combined according to a fourth variable coupling ratio. The fourth variable coupling ratio is the power ratio of combining the phase shifted portion to the modulated portion of the second optical signal, and in this embodiment is equal to the first variable coupling ratio.

The output of the third variable coupler 34 along upper branch waveguide portion 64 is a combination of the modulator portion and the bypass portion of the first optical signal. In the embodiment of the invention shown in FIG. 3, the third variable coupler 34 outputs along the upper branch waveguide portion 64 an optical signal proportional to the sum according to the third variable coupling ratio of the modulated and bypass portions of the first optical signal. The modulated and bypass portions of the first optical signal are added with no additional relative phase shift between them. This optical output from the third variable coupler 34 is referred to as the combined first optical signal.

The output of the fourth variable coupler 36 along lower branch waveguide portion 66 is a combination of the bypass portion and the modulator portion of the second optical signal. In the embodiment of the invention shown in FIG. 3, the fourth variable coupler 36 outputs along the lower branch waveguide portion 66 an optical signal proportional to the sum according to the fourth variable coupling ratio of the bypass and modulated portions of the second optical signal. The bypass and modulated portions of the second optical signal are added with no additional relative phase shift between them. This optical output from the fourth variable coupler 36 is referred to as the combined second optical signal.

The combined first optical signal propagates along the upper branch waveguide portion 64 and is then input to the third phase shifter 44. The third phase shifter 44 imparts a phase shift to the combined first optical signal traversing therethrough to produce a combined phase shifted first optical signal. As shown in FIG. 3, this phase shift is denoted $\phi_3$. The combined phase shifted first optical signal output from the third phase shifter 44 propagates along the upper branch output waveguide portion 8 to a first input of the optical combiner 22.

The combined second optical signal propagates along the lower branch waveguide portion 66 and is then input to the fourth phase shifter 46. The fourth phase shifter 46 imparts a phase shift to the combined second optical signal traversing therethrough to produce a combined phase shifted second optical signal. As shown in FIG. 3, this phase shift is denoted $\phi_4$. The combined phase shifted second optical signal output from the fourth phase shifter 46 propagates along the lower branch output waveguide portion 10 to a second input of the optical combiner 22.

The combined phase shifted first and second optical signals are combined in the optical combiner 22, and output as an output optical signal along output waveguide portion 12. Due to the nature of the preferred MMI 2×2 fixed couplers, it should be noted that the combined phase shifted second optical signal is imparted a phase shift of π/2 relative to the combined phase shifted first optical signal upon combining. This relative phase shift added to the combined phase shifted second optical signal at the optical combiner 22 balances the phase shift imparted to the first optical signal at the optical splitter 20.

With reference to FIG. 3, how the function of the electro-optic modulator of the alternate embodiment achieves the desired result of amplitude modulation of a signal with an adjustable chirp will now be discussed.

It should be noted that specific reference to the various values of the phase shifts $\phi_1$, $\phi_2$, $\phi_3$, and $\phi_4$ are made under the assumption that the optical path length for all optical signals propagating between corresponding elements along parallel paths is the same. Specifically, it is assumed that, along the upper and lower branch input waveguide portions 4, 6 are the same. It is assumed that the optical path lengths along the upper and lower modulator arm input waveguide portions 60, 63, and the upper and lower bypass arm input waveguide portions 61, 62 are the same. It is assumed that the optical path lengths along the upper and lower modulator arm output waveguide portions 70, 73, and the upper and lower bypass arm output waveguide portions 71, 72 are the same. It is assumed that the optical path lengths along the upper and lower branch waveguide portions 64, 66 are the same. Finally it is assumed that the optical path lengths along the upper and lower branch output waveguide portions 8, 10 are the same. It should however be understood that any deviation in the optical path lengths away from this assumption, may be compensated for by an appropriate choice or adjustment of $\phi_1$, $\phi_2$, $\phi_3$, and $\phi_4$.

It should be noted that in general, phase shifts $\phi_1$, $\phi_2$, $\phi_3$, and $\phi_4$ are arranged such that a logical "1" represented in the "data" causes constructive encoding interference somewhere in the electro-optic modulator 100 so that a high amplitude output optical signal is output from the optical combiner 22, and are arranged such that a logical "0" represented in the "data" causes destructive encoding interference somewhere in the electro-optic modulator 100 so that a low amplitude output optical signal (in an exemplary embodiment, the amplitude is insignificant) is output from the optical combiner 22.

In this embodiment, phase shifts $\phi_1$, $\phi_2$, $\phi_3$, and $\phi_4$, are arranged such that constructive encoding interference or destructive encoding interference causing amplitude modulation occurs between the optical signals passing through the first phase modulator 50 and the optical signals passing through the first phase shifter 40 when a phase shift corresponding to a logical "1" or respectively a logical "0" is imparted to the modulator portion of the first optical signal by the first phase modulator 50. The phase shifts are also arranged so that constructive encoding interference or destructive encoding interference causing amplitude modulation occurs between the optical signals passing through the first phase modulator 50 and the third phase shifter 44, and the optical signals passing through the second phase shifter 42 and the fourth phase shifter 46, when a phase shift corresponding to a logical "1" or respectively a logical "0" is imparted to the modulator portion of the first optical signal by the first phase modulator 50. As can be seen, in the configuration shown, encoding interference of the modulated portion of the first optical signal may occur at the variable coupler 34 (in the case where the variable couplers are set to 50:50), at the optical combiner 22 (in the case where the variable couplers are set to 100:0), or at both the variable coupler 34 and the optical combiner 22 (in the case where the variable couplers are set to any single ratio other than 50:50, 100:0, or 0:100).

In this embodiment, phase shifts $\phi_1$, $\phi_2$, $\phi_3$, and $\phi_4$, are arranged such that constructive encoding interference or destructive encoding interference causing amplitude modulation occurs between the optical signals passing through the second phase modulator 52 and the optical signals passing through the second phase shifter 42 when a phase shift corresponding to a logical "1" or respectively a logical "0" is imparted to the modulator portion of the second optical signal by the second phase modulator 52. The phase shifts are also arranged so that constructive encoding interference or destructive encoding interference causing amplitude modulation occurs between the optical signals passing through the second phase modulator 52 and the fourth phase shifter 46, and the optical signals passing through the first phase shifter 40, and the third phase shifter 44, when a phase shift corresponding to a logical "1" or respectively a logical "0" is imparted to the modulator portion of the second optical signal by the second phase modulator 52. As can be seen, in the configuration shown, encoding interference of the modulated portion of the second optical signal may occur at the variable coupler 36 (in the case where the variable couplers are set to 50:50), at the optical combiner 22 (in the case where the variable couplers are set to 0:100), or at both the variable coupler 36 and the optical combiner 22 (in the case where the variable couplers are set to any single ratio other than 50:50, 100:0, or 0:100).

It is noted that in this embodiment, an additional overall phase shift is imparted by the variable couplers 30, 34 to the optical signals passing therethrough which is the same as that imparted by the fourth variable couplers 32, 36 to optical signals passing respectively therethrough.

Since in $\phi(t)$ a logical "1" is represented by a phase shift of $\pi$, and a logical "0" is represented by a phase shift of 0, for the interference conditions to be met, $\pi+\phi_3=\phi_2+\phi_4+2k_1\pi$, $0+\phi_3=\phi_2+\phi_4+(2k_2+1)\pi$, $\pi=\phi_1+2k_3\pi$, and $0=\phi_1+(2k_4+1)\pi$ where $k_1$, $k_2$, $k_3$, and $k_4$ are small integers (so as not to affect the signals on the scale of the encoding rate). Since in $\overline{\phi(t)}$ a logical "1" is represented by a phase shift of 0, and a logical "0" is represented by a phase shift of a, for these interference conditions to be met, $0+\phi_4=\phi_1+\phi_3+2k_5\pi$, $\pi+\phi_4=\phi_1+\phi_3+(2k_6+1)\pi$, $0+_2=2k_7\pi$, and $\pi+\phi_2=(2k_8+1)\pi$ where $k_5$, $k_6$, $k_7$, and $k_8$ are small integers (so as not to affect the signals on the scale of the encoding rate).

In this embodiment the encoding interference conditions are met by setting phases $\phi1$ and $\phi_3$ to $\pi$, and $\phi_2$ and $\phi_4$ to 0. It should be noted that because all of the variable couplers are set to a single coupling ratio, and because the variable couplers do not introduce a variable relative phase difference to signals passing therethrough, if the encoding interference conditions are met by a set of phases $\phi_1$, $\phi_2$, $\phi_3$, and $\phi_4$, these conditions will be met no matter what the coupling ratio is set to, that is no matter what the variable couplers are adjusted to.

It should be noted that other conditions would be present depending on the particular splitters and combiners used, and the particular inputs and outputs used thereof, both of which determine the various relative phases of various optical signals. It also should be borne in mind that the conditions would vary given a different chosen set of values of $\phi(t)$ and $\overline{\phi(t)}$ to represent respective logical "0" and logical "1". Given any configuration in accordance with the principles of the invention, a skilled practitioner in the art would be able to determine within the constraints the proper values of the phase shifts imparted by the phase shifters 40, 42, 44, and 46.

The relative phases used to create appropriately constructive and destructive encoding interference have been discussed. For the purposes of further discussion it is assumed that a logical "1" is represented in the "data" stream as a pulse having a rising and a falling edge. As discussed above, appropriate phase modulation results in amplitude modulation, and hence under the assumption we are making, the combined first optical signal, and the combined second optical signal are made up of logical "1"s represented by amplitude pulses. In general, RZ, NRZ or any data format or shaped pulses may be used. Referring to FIG. 3, the chirp created in the combined first optical signal, and in the combined second optical signal are discussed.

With respect to the combined first optical signal, during a modulation from a logical "0" state to a logical "1" state, the phase shift φ(t) varies from 0 to π, and during the modulation from a logical "1" state back to the logical "0" state, the phase shift φ(t) varies from π to 0. In the modulation of a logical "1" from a data pulse, since the phase of the resulting modulated first optical signal has been increased during the rise of the data pulse (the leading edge), the frequency of the signal is slightly increased during the time of this rising edge and is exhibited as a blue shift of the leading edge of the pulse. Since the phase of the resulting modulated first optical signal has been decreased during the fall of the data pulse (the trailing edge), the frequency of the signal is slightly decreased during the time of this falling edge which is exhibited as a red shift of the trailing edge of the pulse. The blue shifting of the leading edge and the red shifting of the trailing edge is, as described hereinbefore, positive chirp.

With respect to the combined second optical signal, during a modulation from a logical "0" state to a logical "1" state, the phase shift φ(t) varies from π to 0, and during the modulation from a logical "1" state back to the logical "0" state, the phase shift φ(t) varies from 0 back to π. In the modulation of a logical "1" from a data pulse, since the phase of the resulting modulated second optical signal has been decreased during the rise of the data pulse (the leading edge), the frequency of the signal is slightly decreased during the time of this rising edge which is exhibited as a red shift of the leading edge of the pulse. Since the phase of the resulting modulated second optical signal has been increased during the fall of the data pulse (the trailing edge), the frequency of the signal is slightly increased during the time of this falling edge which is exhibited as a blue shift of the trailing edge of the pulse. The red shifting of the leading edge and the blue shifting of the trailing edge is, as described hereinbefore, negative chirp.

With reference to FIG. 3, three specific modes of operation for the alternate embodiment of the electro-optic modulator 100 will now be discussed. These modes serve to illustrate the various limits of operation for the modulator 100, which is in general continuously adjustable.

The first mode of operation is chirpless operation. In such a mode, the variable coupling ratio is set to 50:50. As such one quarter of the power of the input optical signal passes through each of the upper modulator arm input waveguide portion 60, the upper bypass arm input waveguide portion 61, the lower bypass arm input waveguide portion 62, and the lower modulator arm input waveguide portion 63. The resulting output optical signal propagating on output waveguide portion 12 will be made up of a negatively chirped optical signal, and a positively chirped optical signal with the same amplitude modulation, and equal powers. Since the amount of chirp of the negatively chirped signal and the positively chirped signal are exactly the same but of opposite signs (recall $d\overline{\phi(t)}/dt=-d\phi(t)/dt$) the resulting modulated optical signal will have no chirp.

The second mode of operation is maximum positive chirp operation. In such a mode, the variable coupling ratio is set to 100:0. As such, one half of the power of the input optical signal passes through each of the upper modulator arm input waveguide portion 60, and the lower bypass arm input waveguide portion 62, and none of the input optical signal passes through either the upper bypass arm input waveguide portion 61, or the lower modulator arm input waveguide portion 63. The resulting output optical signal propagating on output waveguide portion 12 will be made up of a maximally positively chirped optical signal only.

The third mode of operation is maximum negative chirp operation. In such a mode, the variable coupling ratio is set to 0:100. As such, none of the input optical signal passes through either of the upper modulator arm input waveguide portion 60, or the lower bypass arm input waveguide portion 62, and half of the power of the input optical signal passes through each of the upper bypass arm input waveguide portion 61, and the lower modulator arm input waveguide portion 63. The resulting output optical signal propagating on output waveguide portion 12 will be made up of a maximally negatively chirped optical signal only.

In general, the electro-optic modulator 100 of the alternate embodiment may be operated at any coupling ratio the result being a combination of equally modulated but unequally powered positively and negatively chirped optical signals. This combination will have a non-zero chirp whose sign and magnitude will depend upon the coupling ratio. In this manner, the electro-optic modulator provides an adjustable amount of chirp as a result of varying the coupling ratio of the variable couplers.

Referring to FIG. 4, a specific implementation of the alternate embodiment is described. The variable couplers are explicitly shown as variable 2×2 MZIs. Each consists preferably of two 2×2 MMI 3 dB couplers with parallel interconnecting waveguide arms each with a variable DC phase shifter.

The input of the first variable coupler 30, is coupled to a splitter 30n. The splitter 30n, may be a 1×2 splitter or a 2×2 splitter with one input unused. In the 30 preferred embodiment it is a 2×2 MMI coupler with an input unused. First and second outputs of the splitter 30n are coupled respectively by waveguide portions 30i and 31j to first and second variable DC phase shifter 30a, and 30b. Outputs of the variable phase shifters 30a and 30b are coupled to waveguide portions 30k and 30m which are respectively coupled to a first and second input of a 2×2 coupler 30c which is preferably a 3 dB MMI coupler. The first and second outputs of the 2×2 coupler 30c are coupled respectively to the first and second outputs of the first variable coupler 30. The first variable coupler 30 functions to output the signal input to the first variable coupler 30 along its first and second outputs according to a variable combining ratio determined by the relative phase shifts imparted by the first and second variable DC phase shifters 30a, 30b.

The second variable coupler 32 is similarly structured and functions in a similar manner to the first variable coupler 30.

The first and second inputs of the third variable coupler 34 are coupled respectively to the first and second inputs of a 2×2 coupler 34c. The first and second outputs of the coupler 34c are coupled respectively by waveguide portions 34k and 34m to a first and second variable DC phase shifter 34a, and 34b. Outputs of the variable phase shifters 34a and 34b are coupled to waveguide portions 34i and 34j. Waveguide portions 34i and 34j are coupled to a combiner 34n. The combiner 34n may be a 2×1 combiner or a 2×2 combiner with one output unused. In the preferred embodiment it is a 2×2 MMI with an output unused. The second output of the combiner 34n is coupled to the upper branch waveguide portion 64. The third variable coupler 34 functions to combine and output the signals input to the third variable coupler 34 along its first and second inputs according to a variable combining ratio determined by the relative phase shifts imparted by the first and second variable DC phase shifters 34a, 34b.

The fourth variable coupler 36 is similarly structured and functions in a similar manner to the third variable coupler 34.

The rest of the embodiment depicted in FIG. 4 is structured the same as, and functions the same as the embodiment depicted in FIG. 3.

Although specific example architectures have been illustrated by the preferred and alternate embodiments, it should be understood that there are numerous ways of splitting an optical signal according to a variable ratio, introducing positive and negative chirp to those split portions and recombining the signal according to the variable ratio to obtain a variable chirp. Skilled practitioners in the art will understand that many different embodiments may be constructed according to the principles of the invention.

When appropriately configured, the modulators illustrated herein above can have a small signal chirp parameter that is continuously tunable from −1 to +1, including the zero chirp case. The output will maintain its polarity throughout this range (i.e., always invert the data or never invert the data) other than usual waveguide propagation and modulation losses. Furthermore, packaging with a simple passive dc circuit will enable a user to adjust the chirp with a single dc input voltage pin, enabling software-controlled adjustability.

The invention is equally applicable to any electro-optical material such as Lithium Niobate, GaAs, InP, and polymer. In addition, the embodiments constructed according to the invention require only standard MZM fabrication technology.

As mentioned above, it is possible to construct an electro-optic modulator according to the invention in which there is no amplitude modulation, but instead only a direct phase modulation of an optical signal passing therethrough. In such a case, according to the invention an optical signal is split according to a variable coupling ratio, a phase modulation is imparted to one portion of the split optical signal while a inverse or reverse phase modulation will be introduced (recall $d\overline{\phi(t)}/dt=-d\phi(t)/dt$) to another portion of the optical signal. A pulsed optical signal would be chirped by application of the appropriate phase modulation during the pulses. The oppositely phase modulated optical signals are recombined according to the variable coupling ratio resulting in a variably chirped signal.

As mentioned above the amplitude and phase modulation of the electro-optic modulator can be applied to signals already in the form of optical pulses. In this case driving the phase modulators with a "data" signal which corresponds to the time varying optical pulse power (and possibly its reverse) would allow for phase and amplitude remodulation of the optical pulses, and could be used to adjustably re-chirp the optical signal.

Although the specific embodiments shown are input with a single optical signal it is possible for an electro-optic modulator constructed according to the invention to have a number of inputs for signals whose power may be tuned or balanced after which they could be phase modulated and combined into an output optical signal. As such an optical signal may be split before being fed into the electro-optic modulator.

Numerous modifications and variations of the present invention are possible in light of the above teachings. It is therefore to be understood that within the scope of the appended claims, the invention may be practised otherwise than as specifically described herein.

We claim:
1. An electro-optic modulator for generating an output optical signal having an adjustable chirp from at least one input optical signal, the electro-optic modulator comprising:
   optical signal splitting means for splitting according to an adjustable coupling ratio the at least one input optical signal into a first optical signal and a second optical signal;
   a first modulating means for amplitude modulating the first optical signal with a positive chirp, generating a positively chirped optical signal;
   a second modulating means for amplitude modulating the second optical signal with a negative chirp, generating a negatively chirped optical signal; and
   optical signal combining means for combining according to the adjustable coupling ratio the positively chirped optical signal and the negatively chirped optical signal, generating an output optical signal;
   whereby the adjustable coupling ratio determines a magnitude and a sign of the adjustable chirp of the output optical signal.

2. An electro-optic modulator according to claim 1, wherein the first and second modulating means each comprise an interferometer and an optical phase modulator.

3. An electro-optic modulator according to claim 1, wherein the positive chirp is equal in magnitude and opposite in sign to the negative chirp.

4. An electro-optic modulator according to claim 1, wherein the optical signal splitting means comprises at least one splitting variable coupler having a coupling ratio equal to the adjustable coupling ratio, and wherein the optical signal combining means comprises at least one combining variable coupler having a coupling ratio equal to the adjustable coupling ratio.

5. An electro-optic modulator according to claim 1, further comprising at least one phase shifting means for ensuring that the negatively chirped optical signal and the positively chirped optical signal constructively interfere when the first and second modulating means constructively modulate optical signals passing therethrough.

6. An electro-optic modulator according to claim 1, wherein the optical signal splitting means comprises a splitting variable coupler having a coupling ratio equal to the adjustable coupling ratio, wherein the optical signal combining means comprises a combining variable coupler having a coupling ratio equal to the adjustable coupling ratio, wherein the first modulating means comprises a first Mach-Zehnder Interferometer having a first optical phase modulator along a first interferometer waveguide arm, wherein the second modulating means comprises a second Mach-Zehnder Interferometer having a second optical phase modulator along a second interferometer waveguide arm, wherein a first optical phase modulator phase modulates a portion of the first optical signal traversing the first interferometer waveguide arm as a function of a first phase function of time, the first phase function of time having a first time derivative, and wherein the second optical phase modulator modulates a portion of the second optical signal traversing the second interferometer waveguide arm as a function of a second phase function of time, the second phase function of time having a first time derivative which is the negative of the first time derivative of the first phase function of time.

7. An electro-optic modulator according to claim 6, wherein the splitting variable coupler and the combining variable coupler are Mach-Zehnder interferometers with variable DC phase shifters along each of the interferometer waveguide arms.

8. An electro-optic modulator for generating an output optical signal having an adjustable chirp from at least one input optical signal, the electro-optic modulator comprising:
   optical signal splitting means for splitting the at least one input optical signal into a first optical signal, a second optical signal, and N optical signals, the optical signal splitting means having at least one splitting variable coupler having an adjustable coupling ratio for adjusting a power ratio of the first optical signal to the second optical signal;
   a first optical phase modulator for phase modulating the first optical signal as a function of a first phase function of time, the first phase function of time having a first time derivative;
   a second optical phase modulator for phase modulating the second optical signal as a function of a second phase function of time, the second phase function of time having a first time derivative which is the negative of the first time derivative of the first phase function of time; and
   optical signal combining means for combining the first optical signal, a first portion of the N optical signals, the second optical signal, and a second portion of the N optical signals, generating an output optical signal, the optical signal combining means having at least one combining variable coupler having a coupling ratio equal to the adjustable coupling ratio for combining the first and second optical signals according to the adjustable coupling ratio, wherein the power and phase of the first portion of the N optical signals are such that when combined with the first optical signal an amplitude modulated optical signal with a positive chirp results, and wherein the power and phase of the second portion of the N optical signals are such that when combined with the second optical signal an amplitude modulated optical signal with a negative chirp results;
   whereby the adjustable coupling ratio determines a magnitude and a sign of the adjustable chirp of the output optical signal.

9. An electro-optic modulator according to claim 8, further comprising at least one phase shifting means for ensuring that the amplitude modulated signal with a negative chirp and the amplitude modulated signal with a positive chirp constructively interfere when the first and second modulating means constructively modulate optical signals passing therethrough.

10. An electro-optic modulator according to claim 8, wherein the optical signal splitting means comprises a first and a second splitting variable coupler having coupling ratios equal to the adjustable coupling ratio, wherein the optical signal combining means comprises a first and a second combining variable coupler having coupling ratios equal to the adjustable coupling ratio, wherein the first splitting variable coupler and the first combining variable coupler are arranged in a configuration of a first Mach-Zehnder interferometer with the first phase modulator situated along a first arm of the first Mach-Zehnder interferometer, wherein the second splitting variable coupler and the second combining variable coupler are arranged in a configuration of a second Mach-Zehnder interferometer with the second phase modulator situated along a second arm of the second Mach-Zehnder interferometer, and wherein the optical signal combining means comprises an optical combiner for combining an output of the first combining variable coupler and an output of the second combining variable coupler.

11. An electro-optic modulator according to claim 10, wherein the first and second splitting variable couplers and the first and second combining variable couplers are Mach-Zehnder interferometers with variable DC phase shifters along each of interferometer waveguide arm.

12. An electro-optic modulator for applying an adjustable chirp to at least one input optical signal, the electro-optic modulator comprising:
   optical signal splitting means for splitting according to an adjustable coupling ratio the at least one input optical signal into a first optical signal and a second optical signal;
   a first optical phase modulator for phase modulating as a function of a first phase function of time the first optical signal, the first phase function of time having a first time derivative;
   a second optical phase modulator for phase modulating as a function of a second phase function of time the second optical signal, the second phase function of time having a first time derivative which is the negative of the first time derivative of the first phase function of time; and
   optical signal combining means for combining according to the adjustable coupling ratio the first optical signal and the second optical signal after they have been modulated, generating an output optical signal;
   whereby the adjustable coupling ratio determines a magnitude and a sign of the adjustable chirp applied to the at least one input optical signal to generate the output optical signal.

13. A method of generating an output optical signal having an adjustable chirp from at least one input optical signal, the method comprising:
   splitting according to an adjustable coupling ratio the at least one input optical signal into a first optical signal and a second optical signal;
   amplitude modulating the first optical signal with a positive chirp, generating a positively chirped optical signal;
   amplitude modulating the second optical signal with a negative chirp, generating a negatively chirped optical signal; and
   combining according to the adjustable coupling ratio the positively chirped optical signal and the negatively chirped optical signal, generating an output optical signal;
   whereby the adjustable coupling ratio determines a magnitude and a sign of the adjustable chirp of the output optical signal.

14. A method of generating an output optical signal having an adjustable chirp from at least one input optical signal, the method comprising:
   splitting the at least one input optical signal into a first optical signal, a second optical signal, and N optical signals;
   adjusting a power ratio of the first optical signal to the second optical signal according to an adjustable coupling ratio;
   phase modulating the first optical signal as a function of a first phase function of time, the first phase function of time having a first time derivative;
   phase modulating the second optical signal as a function of a second phase function of time, the second phase function of time having a first time derivative which is the negative of the first time derivative of the first phase function of time; and
   combining the first optical signal, a first portion of the N optical signals, the second optical signal, and a second portion of the N optical signals, wherein the first and second optical signals are combined according to the adjustable coupling ratio, generating an output optical signal, wherein the power and phase of the first portion of the N optical signals are such that when combined with the first optical signal an amplitude modulated optical signal with a positive chirp results, and wherein the power and phase of the second portion of the N optical signals are such that when combined with the second optical signal an amplitude modulated optical signal with a negative chirp results, and wherein the amplitude modulated signal with a negative chirp and the amplitude modulated signal with a positive chirp constructively interfere when they are combined;

whereby the adjustable coupling ratio determines a magnitude and a sign of the adjustable chirp of the output optical signal.

15. A method of applying an adjustable chirp to at least one input optical signal, the method comprising:

splitting according to an adjustable coupling ratio the at least one input optical signal into a first optical signal and a second optical signal;

phase modulating as a function of a first phase function of time the first optical signal, the first phase function of time having a first time derivative;

phase modulating as a function of a second phase function of time the second optical signal, the second phase function of time having a first time derivative which is the negative of the first time derivative of the first phase function of time; and combining according to the adjustable coupling ratio the first optical signal and the second optical signal after they have been modulated, generating an output optical signal;

whereby the adjustable coupling ratio determines a magnitude and a sign of the adjustable chirp applied to the at least one input optical signal to generate the output optical signal.

* * * * *